US011232013B2

(12) United States Patent
Togawa

(10) Patent No.: US 11,232,013 B2
(45) Date of Patent: Jan. 25, 2022

(54) LOG ANALYSIS SYSTEM, LOG ANALYSIS METHOD, AND LOG ANALYSIS PROGRAM FOR A USER INTERFACE

(71) Applicant: NEC Corporation, Tokyo (JP)

(72) Inventor: Ryosuke Togawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 393 days.

(21) Appl. No.: 15/774,484

(22) PCT Filed: Nov. 9, 2016

(86) PCT No.: PCT/JP2016/004844
§ 371 (c)(1),
(2) Date: May 8, 2018

(87) PCT Pub. No.: WO2017/081866
PCT Pub. Date: May 18, 2017

(65) Prior Publication Data
US 2020/0257610 A1 Aug. 13, 2020

(30) Foreign Application Priority Data
Nov. 13, 2015 (JP) .............................. JP2015-223053

(51) Int. Cl.
G06F 11/34 (2006.01)
G06F 40/174 (2020.01)
(Continued)

(52) U.S. Cl.
CPC ...... *G06F 11/3476* (2013.01); *G06F 11/0775* (2013.01); *G06F 17/40* (2013.01); *G06F 40/174* (2020.01)

(58) Field of Classification Search
CPC ... G06F 11/3476; G06F 17/40; G06F 11/0775
See application file for complete search history.

(56) References Cited

U.S. PATENT DOCUMENTS 9,552,249 B1 * 1/2017 James ................. G06F 11/0793
9,729,671 B2 * 8/2017 Faizanullah ........... G06F 8/443
(Continued)

FOREIGN PATENT DOCUMENTS

JP 2005-141663 A 6/2005
JP 2006252459 A 9/2006
(Continued)

OTHER PUBLICATIONS

International Search Report of PCT/JP2016/004844 dated Jan. 31, 2017.
(Continued)

*Primary Examiner* — Asher D Kells
(74) *Attorney, Agent, or Firm* — Sughrue Mion, PLLC

(57) ABSTRACT

The present invention provides a log analysis system, a log analysis method, and a log analysis program that can aggregate and output logs having a correlation. A log analyzing system 100 according to one example embodiment of the present invention includes a sequence determination unit 130 that determines which predetermined sequence is matched with a plurality of logs of an analysis target log 10; and a log aggregation unit 140 that, based on the sequence, aggregates and outputs the plurality of logs determined to match the sequence by the sequence determination unit.

9 Claims, 9 Drawing Sheets

(51) Int. Cl.
*G06F 11/07* (2006.01)
*G06F 17/40* (2006.01)

(56) References Cited

U.S. PATENT DOCUMENTS

| | | | | |
|---|---|---|---|---|
| 10,528,454 B1* | 1/2020 | Baraty | ................... | G06F 17/40 |
| 2002/0026589 A1* | 2/2002 | Fukasawa | ........... | G06F 11/3423 |
| | | | | 726/4 |
| 2010/0115443 A1* | 5/2010 | Richstein | ............ | G06F 11/0706 |
| | | | | 715/771 |
| 2012/0143893 A1* | 6/2012 | Abraham | ............ | G06F 16/2428 |
| | | | | 707/769 |
| 2013/0073526 A1* | 3/2013 | Deluca | ................ | G06F 11/3612 |
| | | | | 707/692 |
| 2014/0317137 A1 | 10/2014 | Hanaoka et al. | | |
| 2016/0098342 A1* | 4/2016 | Faizanullah | ............ | H04L 67/34 |
| | | | | 717/131 |
| 2017/0344413 A1* | 11/2017 | Chakra | ............... | G06F 11/0766 |
| 2018/0203795 A1* | 7/2018 | Gadiya | ............... | G06F 11/3636 |
| 2020/0073741 A1* | 3/2020 | Wang | .................. | G06F 11/0778 |

FOREIGN PATENT DOCUMENTS

| | | |
|---|---|---|
| JP | 2006259811 A | 9/2006 |
| JP | 2007-249694 A | 9/2007 |
| JP | 2006-020984 A | 1/2008 |
| JP | 2008-041041 A | 2/2008 |
| WO | 2013/136418 A1 | 9/2013 |

OTHER PUBLICATIONS

Communication dated Dec. 17, 2020, from the Japanese Patent Office in application No. 2017549986.
Japanese Office Action for JP Application No. 2017-549986 dated Jun. 22, 2021 with English Translation.

* cited by examiner

FIG.2A

| LOG (message.log) | LOG (syslog.log) |
|---|---|
| 2015/08/17 08:29:37 [SV008] JNW 3258 started | 2015/08/17 08:29:59 [SV003] CPU usage exceeded threshold [192.168.1.23] |
| 2015/08/17 08:31:18 [SV007] JNW P082 started | 2015/08/17 08:31:37 [SV004] Request to SV003 was timeout |
| ⋮ | 2015/08/17 08:32:30 [SV004] Request to SV003 was timeout |
| | ⋮ |

FIG.2B

| Format ID | Format |
|---|---|
| 039 | <variable: timestamp> [<variable: character string>] JNW <variable: number> started |
| 071 | <variable: timestamp> [<variable: character string>] JNW <variable: number> ended |
| 144 | <variable: timestamp> [PF] Anomaly occurred in alive monitoring [<variable: IP>] |
| 223 | <variable: timestamp> [<variable: character string>] CPU usage exceeded threshold [<variable: IP>] |
| 300 | <variable: timestamp> [Request <variable: number>] Process <variable: character string> |
| 585 | <variable: timestamp> [SV004] Request to SV003 was timeout |

FIG.2C

| SEQUENCE ID | SEQUENCE DEFINITION |
|---|---|
| A | 039, 223, 039 |
| B | 144, 071 |
| X | 585, 585, 585 |

| FILE NAME | LOG | FORMAT ID | SEQUENCE ID |
|---|---|---|---|
| message.log | 2015/08/17 08:29:37 [SV008] JNW 3258 started | 039 | A |
| syslog.log | 2015/08/17 08:29:59 [SV003] CPU usage exceeded threshold [192.168.1.23] | 223 | A |
| message.log | 2015/08/17 08:31:18 [SV007] JNW P082 started | 039 | A |
| syslog.log | 2015/08/17 08:30:42 [PF] Anomaly occurred in alive monitoring [<variable: IP>] | 144 | B |
| message.log | 2015/08/17 08:32:02 [SV007] JNW 3331 ended | 071 | B |

FIG.7A

| SEQUENCE ID | SEQUENCE DEFINITION |
|---|---|
| C | 300(Start), 300(Retry), 300(End) |

FIG.7B

| SEQUENCE ID | SEQUENCE DEFINITION |
|---|---|
| D | SV008, SV003, SV007 |
| E | 192.168.1.23, P082 |
| F | 3258, SV004 |

FIG.7C

| SEQUENCE ID | SEQUENCE DEFINITION |
|---|---|
| G | 039(message.log), 223(syslog.log), 039(message.log) |
| H | 144(syslog.log), 071(message.log) |
| J | 585(syslog.log), 585(syslog.log), 585(syslog.log) |

FIG.8

| FILE NAME | LOG | FORMAT ID | SEQUENCE ID |
|---|---|---|---|
| syslog.log | 2015/11/03 10:00:00 [Request001] Process Start | 300 | C |
| syslog.log | 2015/11/03 10:00:03 [Request001] Process Retry | 300 | C |
| syslog.log | 2015/11/03 10:01:04 [Request001] Process End | 300 | C |

# LOG ANALYSIS SYSTEM, LOG ANALYSIS METHOD, AND LOG ANALYSIS PROGRAM FOR A USER INTERFACE

CROSS REFERENCE TO RELATED APPLICATIONS

This application is a National Stage of International Application No. PCT/JP2016/04844 filed Nov. 9, 2016, claiming priority based on Japanese Patent Application No. 2015-223053 filed Nov. 13, 2015, the disclosure of which is incorporated herein in its entirety by reference.

TECHNICAL FIELD

The present invention relates to a log analysis system, a log analysis method, and a log analysis program for performing log analysis.

BACKGROUND ART

In a system executed on a computer, logs each including a result of an event, a message, or the like are output. When analyzing logs in order to search for a cause of a system anomaly or the like, a user (operator or the like) is required to review a number of logs output from the system. In order to reduce burden on the user, it is demanded to output logs in a manner to be easily viewed.

Patent Literature 1 discloses an art of extracting logs in accordance with a keyword input by a user and displaying the appearance position of the logs in a temporal map. A use of the art of Patent Literature 1 enables a user to acquire logs including a particular keyword and know the timing or the distribution of appearances of the logs in a visible manner.

CITATION LIST

Patent Literature

PTL 1: Japanese Patent Application Publication No. 2005-141663

SUMMARY OF INVENTION

A plurality of devices and programs are included in a general system, and multiple types of log data (for example, a log file or the like) are output from these devices and programs. However, since the art of Patent Literature 1 extracts logs based on whether or not a keyword is included, it is not possible to extract logs based on a correlation among logs from multiple types of log data. In order to analyze a correlation among a plurality of logs, the user is required to find a related part from multiple types of log data.

The present invention has been made in view of the problem described above and intends to provide a log analysis system, a log analysis method, and a log analysis program that can aggregate and output logs having a correlation.

The first example aspect of the present invention is a log analysis system including: a sequence determination unit that determines which predetermined sequence is matched with a plurality of logs of an analysis target log; and a log aggregation unit that, based on the sequence, aggregates and outputs the plurality of logs determined to match the sequence by the sequence determination unit.

The second example aspect of the present invention is a log analysis method including steps of: determining which predetermined sequence is matched with a plurality of logs of an analysis target log; and, based on the sequence, aggregating and outputting the plurality of logs determined to match the sequence.

The third example aspect of the present invention is a log analysis program that causes a computer to perform steps of: determining which predetermined sequence is matched with a plurality of logs of an analysis target log; and, based on the sequence, aggregating and outputting the plurality of logs determined to match the sequence by the sequence determination unit.

According to the present invention, a plurality of logs having a predetermined correlation can be aggregated and output based on whether or not the plurality of logs match a predetermined sequence.

BRIEF DESCRIPTION OF DRAWINGS

FIG. 2A is a schematic diagram of an analysis target log according to the first example embodiment.

FIG. 2B is a schematic diagram of a format according to the first example embodiment.

FIG. 2C is a schematic diagram of a sequence according to the first example embodiment.

FIG. 7A is a schematic diagram of a sequence according to a second example embodiment.

FIG. 7B is a schematic diagram of a sequence according to the second example embodiment.

FIG. 7C is a schematic diagram of a sequence according to the second example embodiment.

FIG. 8 is a schematic diagram of aggregation results according to the second example embodiment.

DESCRIPTION OF EMBODIMENTS

Figure 1:
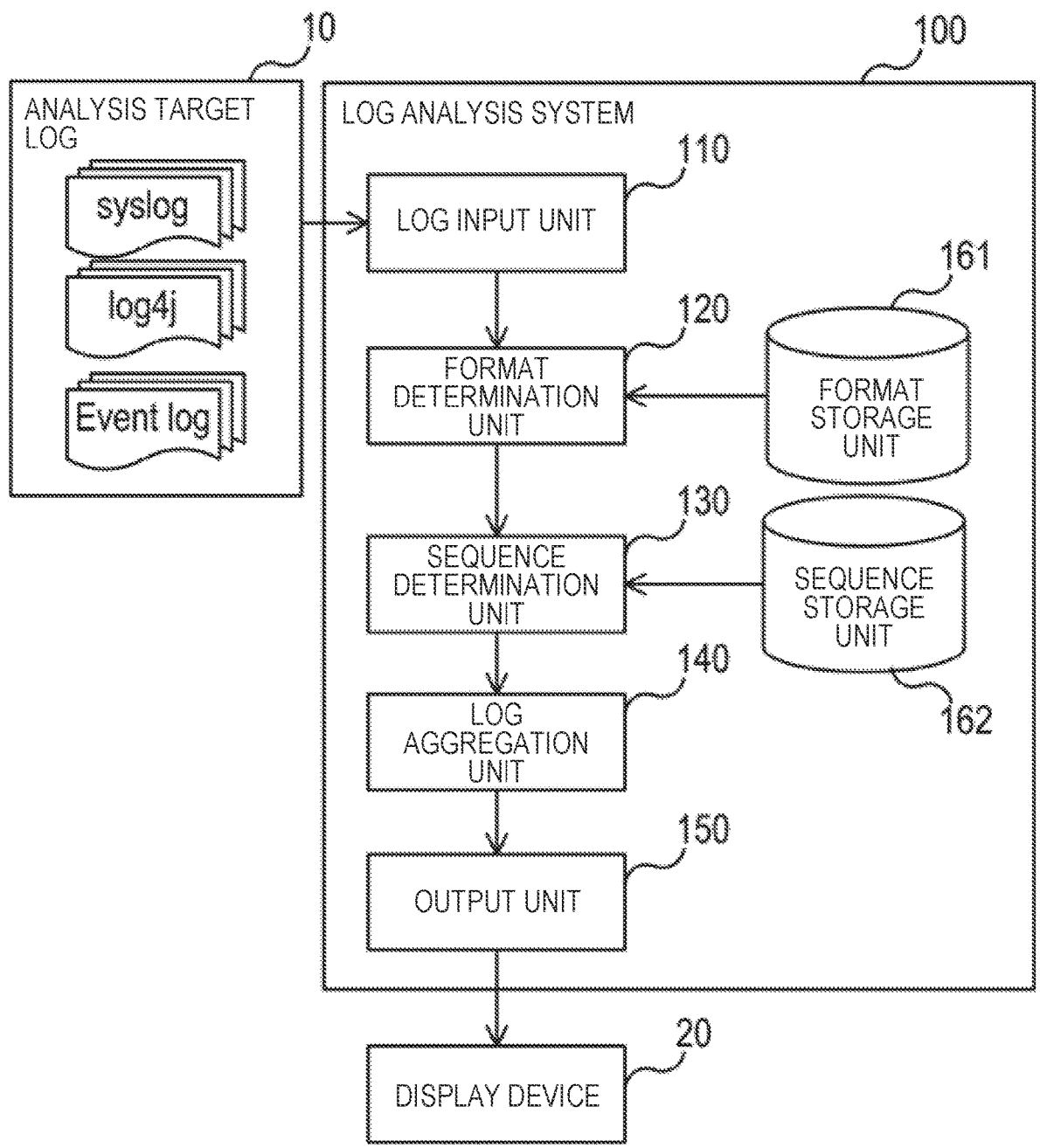
FIG. 1 is a block diagram of a log analysis system according to a first example embodiment.

While example embodiments of the present invention will be described below with reference to the drawings, the present invention is not limited to these example embodiments. Note that, in the drawings described below, those having the same function are labeled with the same reference, and the duplicated description thereof may be omitted.

First Example Embodiment

FIG. 1 is a block diagram of a log analysis system 100 according to the present example embodiment. In FIG. 1, the arrows indicate main data flows, and there may be other data flows than is illustrated in FIG. 1. In FIG. 1, each block illustrates a configuration of a function unit rather than a configuration as a unit of hardware (device). Thus, each block illustrated in FIG. 1 may be implemented within a single device or may be implemented separately in multiple devices. Data transaction among blocks may be performed via any means such as a data bus, a network, a portable storage medium, or the like.

The log analysis system 100 has a log input unit 110, a format determination unit 120, a sequence determination unit 130, a log aggregation unit 140, and an output unit 150 as a processing unit. Further, the log analysis system 100 has a format storage unit 161 and a sequence storage unit 162 as a storage unit.

The log input unit 110 acquires an analysis target log 10 and inputs the analysis target log 10 to the log analysis system 100. The analysis target log 10 may be acquired from the outside of the log analysis system 100 or may be acquired by reading those recorded in advance inside the log analysis system 100. The analysis target log 10 includes one or more logs output from one or more devices or programs. The analysis target log 10 is a log that is represented in any data form (file form), which may be binary data or text data, for example. Further, the analysis target log 10 may be recorded as a table of a database or may be recorded as a text file.

FIG. 2A is a schematic diagram of an exemplary analysis target log 10. The analysis target log 10 in the present example embodiment includes one or more any number of logs in a unit of a single log output from a device or a program. A log may be a single row of a character string or multiple rows of character strings. That is, the analysis target log 10 designates the whole logs included in the analysis target log 10, and a log denotes a single log picked out from the analysis target log 10. Each log includes a timestamp, a message, and the like.

The analysis target log 10 is made of first log data 11 and second log data 12. The first log data 11 and the second log data 12 are recorded as separate data (for example, files, tables, or the like) each of which includes one or more logs. The first log data 11 and the second log data 12 are attached with identifiers (for example, a file name such as message.log or syslog.log), respectively, and thereby distinguished. The number of log data is not limited to the above and may be any number of one or more.

The format determination unit 120 is a form determination unit that determines which format prerecorded in the format storage unit 161 each log included in the analysis target log 10 (the first log data 11 and the second log data 12) conforms to and that uses the conforming format to separate each log into a variable and a common part. A format is a form of a known log. A variable is a changeable part in a format, and a common part is unchanging part in a format of a log. A value (including a number, a character string, and other data) of a variable in the input log is referred to as a variable value.

FIG. 2B is a schematic diagram of an exemplary format recorded in the format storage unit 161. A format includes a character string representing a format associated with a unique ID. The format defines a variable by describing a predetermined identifier in the changeable part of a log and defines a part other than the variable of the log as a common part. As an identifier of a variable, for example "<variable: timestamp>" indicates a variable representing a timestamp, "<variable: character string>" indicates a variable representing any character string, "<variable: number>" indicates a variable representing any number, and "<variable: IP>" indicates a variable representing any IP address. An identifier of a variable is not limited to the above and may be defined by any method such as normalized expression, a list of possible values, or the like. Further, a format may be formed of only the common part without including a variable or may be formed of only the variable without including a common part.

For example, the format determination unit 120 determines that a log on the second row of the second log data 12 conforms to a format whose ID is 223 in FIG. 2B. The format determination unit 120 then processes the log based on the determined format and determines the timestamp "2015/08/17 08:29:59", the character string "SV003", and the IP address "192.168.1.23" as variable values.

While represented by a list of character strings for better visibility in FIG. 2B, a format may be represented in any data form (file form), and may be binary data or text data, for example. Further, a format may be recorded in the format storage unit 161 as a text file or may be recorded in the format storage unit 161 as a table of a database.

The sequence determination unit 130 is a log analysis unit that performs determination of a sequence based on sequence information recorded in the sequence storage unit 162. The sequence information is information that defines the order (sequence) by which logs are output based on information on logs.

FIG. 2C is a schematic diagram of exemplary sequence information recorded in the sequence storage unit 162. The sequence information includes a list of format IDs each defining the sequence associated with a sequence ID that is an identifier of the sequence. Each sequence defines that logs are output in the order of the format IDs recorded in the sequence storage unit 162. The content of logs used for defining a sequence is not limited to the format ID and may be any information on a log to be analyzed, such as a variable value included in the log, an identifier (file name) of the log, or the like. The sequence determination unit 130 extracts, from logs whose formats have been determined by the format determination unit 120, logs which match any of the sequences recorded in the sequence storage unit 162. The log aggregation unit 140 then rearranges the logs which match the sequence according to the sequence determined by the sequence determination unit 130 and aggregates and outputs the rearranged logs. The sequence determination process performed by the sequence determination unit 130 may be performed on multiple types of log data (for example, the first log data 11 and the second log data 12) or may be performed on one log data. Although the sequence determination unit 130 outputs logs in the order defined as a sequence, logs included in a list of the format IDs may be aggregated and output regardless of the order.

For example, because the format IDs of logs on the second row and the third row of the first log data 11 is 039 and the format ID of a log on the second row of the second log data 12 is 223, the sequence determination unit 130 determines that these logs match a sequence whose sequence ID is A in FIG. 2C (hereafter, referred to as a sequence A). The sequence determination unit 130 then extracts these logs as the logs matching the sequence A. The log aggregation unit 140 rearranges the logs according to the sequence A and aggregates and outputs the rearranged logs. A plurality of sets of logs may match a single sequence. The sequence determination unit 130 repeats the determination on other sequence IDs.

Figures 3, 4A:
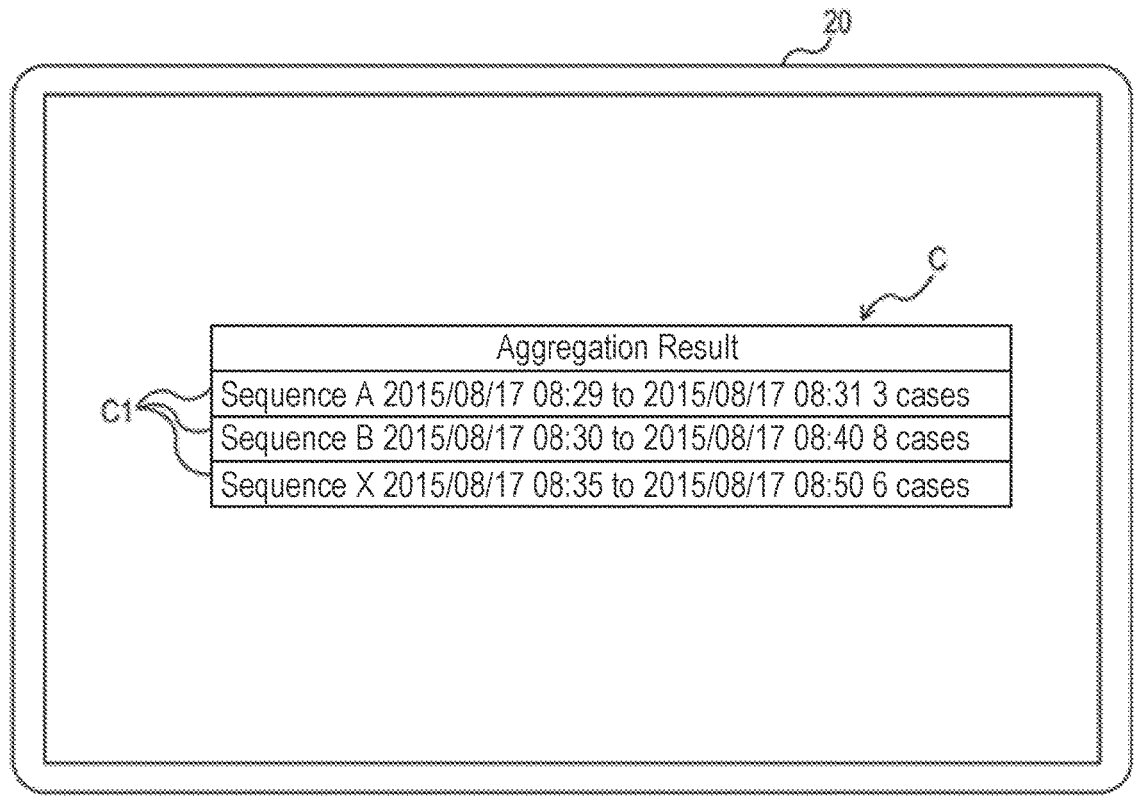
FIG. 3 is a schematic diagram of aggregation results according to the first example embodiment.
FIG. 4A is a schematic diagram of a window displaying aggregation results according to the first example embodiment.

FIG. 3 is a schematic diagram illustrating an exemplary aggregation result obtained by the log aggregation unit 140.

The aggregation result includes the file names of logs, the logs, format IDs of the logs, and the sequence IDs determined by the log aggregation unit 140 that are associated with each other. As discussed above, for a group of logs whose format IDs match the sequence definition illustrated in FIG. 2C, a sequence ID corresponding to the sequence definition is recorded. The aggregation result illustrated in FIG. 3 is an example and may be recorded in any form. While represented by a list of character strings for better visibility in FIG. 3, the aggregation results may be represented in any data form (file form), for example, may be binary data or text data. Further, aggregation results may be recorded separately in a plurality of files or tables.

The output unit 150 outputs aggregation results obtained by the log aggregation unit 140. In the present example embodiment, the output unit 150 outputs aggregation results to a display device 20 and displays the aggregation results to the user as an image. The display device 20 has a display unit such as a liquid crystal display, a cathode ray tube (CRT) display, or the like for displaying an image.

Figure 4B:
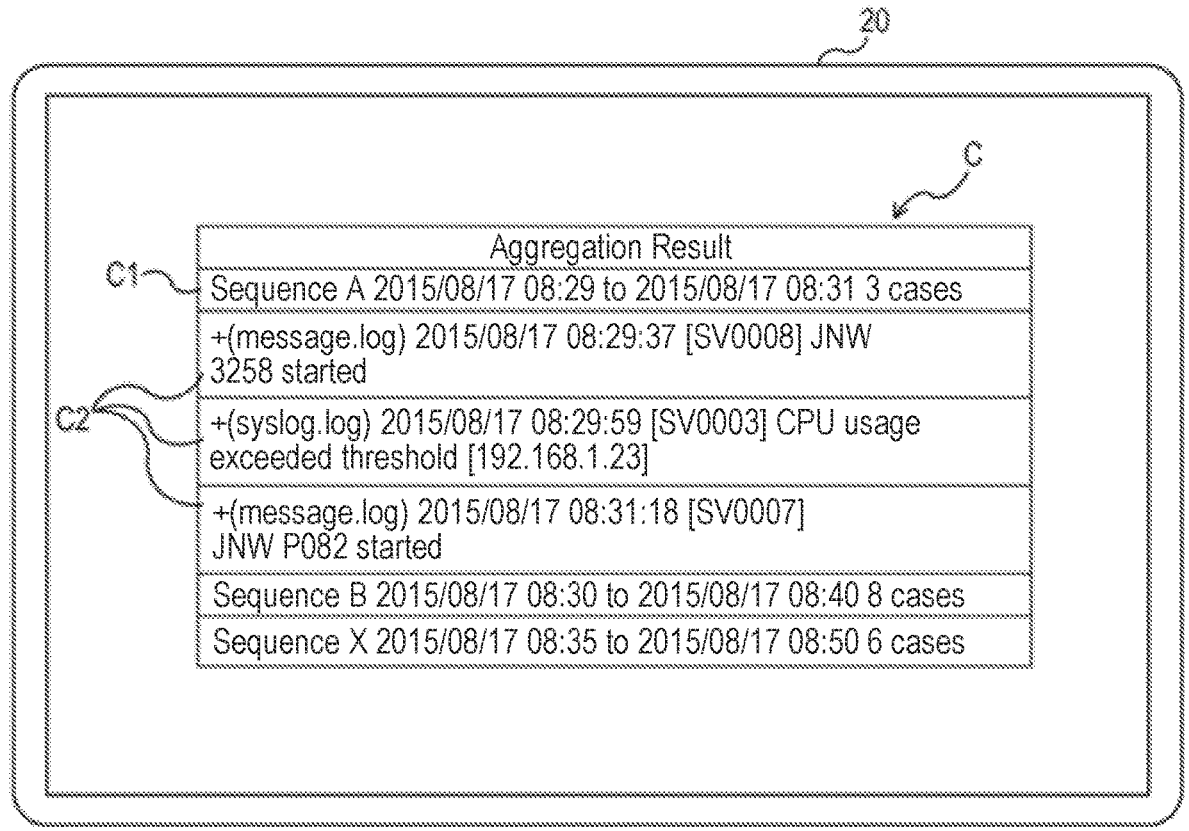
FIG. 4B is a schematic diagram of a window displaying aggregation results according to the first example embodiment.

FIG. 4A and FIG. 4B are schematic diagrams illustrating a display window of exemplary aggregation results using the display device 20. A window C illustrated in FIG. 4A displays headings C1 for respective sequences according to the aggregation results obtained by the log aggregation unit 140. Each of the headings C1 includes a time range and the number of logs which match a sequence. The heading C1 may include other information.

When the user selects a particular sequence heading C1 by using an input device, the window C displays developed logs C2 which match the sequence as illustrated in FIG. 4B. The logs C2 in the selected sequence are rearranged and displayed in temporal order based on the timestamps in the logs. Although the logs C2 which match the sequence A are displayed in ascending order by time from the top in FIG. 4B, descending order may be applied. An identifier (file name in this example) of log data including the log is displayed in the head of each log C2.

The windows illustrated in FIG. 4A and FIG. 4B are examples, and any display scheme may be used as long as logs of aggregation results obtained by the log aggregation unit 140 can be displayed to a user in a visible manner. By referring to the windows of FIG. 4A and FIG. 4B, the user can collectively acquire logs which match a sequence registered in advance and can view the logs in a temporal sequence which are distributed over a plurality of log data.

An output scheme of aggregation results is not limited to the image display to the user. For example, the output unit 150 may output aggregation results as data, and the log analysis system 100 or other systems may perform an analysis process, a statistics process, or the like on the data of aggregation results obtained from the output unit 150.

Figure 5:
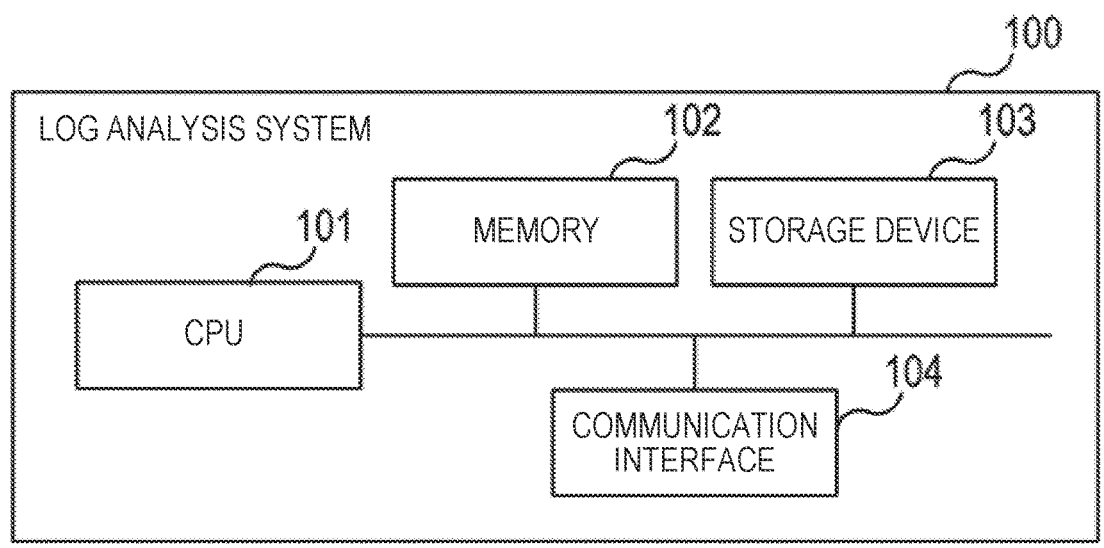
FIG. 5 is a general configuration diagram of the log analysis system according to the first example embodiment.

FIG. 5 is a general configuration diagram illustrating an exemplary device configuration of the log analysis system 100 according to the present example embodiment. The log analysis system 100 has a central processing unit (CPU) 101, memory 102, a storage device 103, and a communication interface 104. The log analysis system 100 may be connected to the display device 20 via the communication interface 104 or may include the display device 20. The log analysis system 100 can be a standalone device or may be integrally configured with another device.

The communication interface 104 is a communication unit that transmits and receives data and is configured to be able to perform at least one of the communication schemes of wired communication and wireless communication. The communication interface 104 includes a processor, an electric circuit, an antenna, a connection terminal, or the like required for the above communication scheme. The communication interface 104 is connected to a network using the above communication scheme in accordance with signals from the CPU 101 for communication. For example, the communication interface 104 externally receives an analysis target log 10.

The storage device 103 stores a program executed by the log analysis system 100, data resulted from processing by the program, or the like. The storage device 103 includes a read only memory (ROM) that is dedicated to reading, a hard disk drive or a flash memory that is readable and writable, or the like. Further, the storage device 103 may include a computer readable portable storage medium such as a CD-ROM. The memory 102 includes a random access memory (RAM) or the like that temporarily stores data being processed by the CPU 101 or a program and data read from the storage device 103.

The CPU 101 is a processor as a processing unit that temporarily stores transient data used for processing in the memory 102, reads a program stored in the storage device 103, and performs various processing operations such as calculation, control, determination, or the like on the transient data in accordance with the program. Further, the CPU 101 stores data of a process result in the storage device 103 and also transmits the data of the process result externally via the communication interface 104.

The CPU 101 in the present example embodiment functions as the log input unit 110, the format determination unit 120, the sequence determination unit 130, the log aggregation unit 140, and the output unit 150 of FIG. 1 by executing a program stored in the storage device 103. Further, the storage device 103 in the present example embodiment functions as the format storage unit 161 and the sequence storage unit 162 of FIG. 1.

The log analysis system 100 is not limited to the specific configuration illustrated in FIG. 5. The log analysis system 100 is not limited to a single device and may be configured such that two or more physically separated devices are connected by wired or wireless connection. Respective units included in the log analysis system 100 may be implemented by electric circuitry, respectively. Electric circuitry here is a term conceptually including a single device, multiple devices, a chipset, or a cloud.

Further, at least a part of the log analysis system 100 may be provided in a form of Software as a Service (SaaS). That is, at least a part of the functions for implementing the log analysis system 100 may be performed by software executed via a network.

Figure 6:
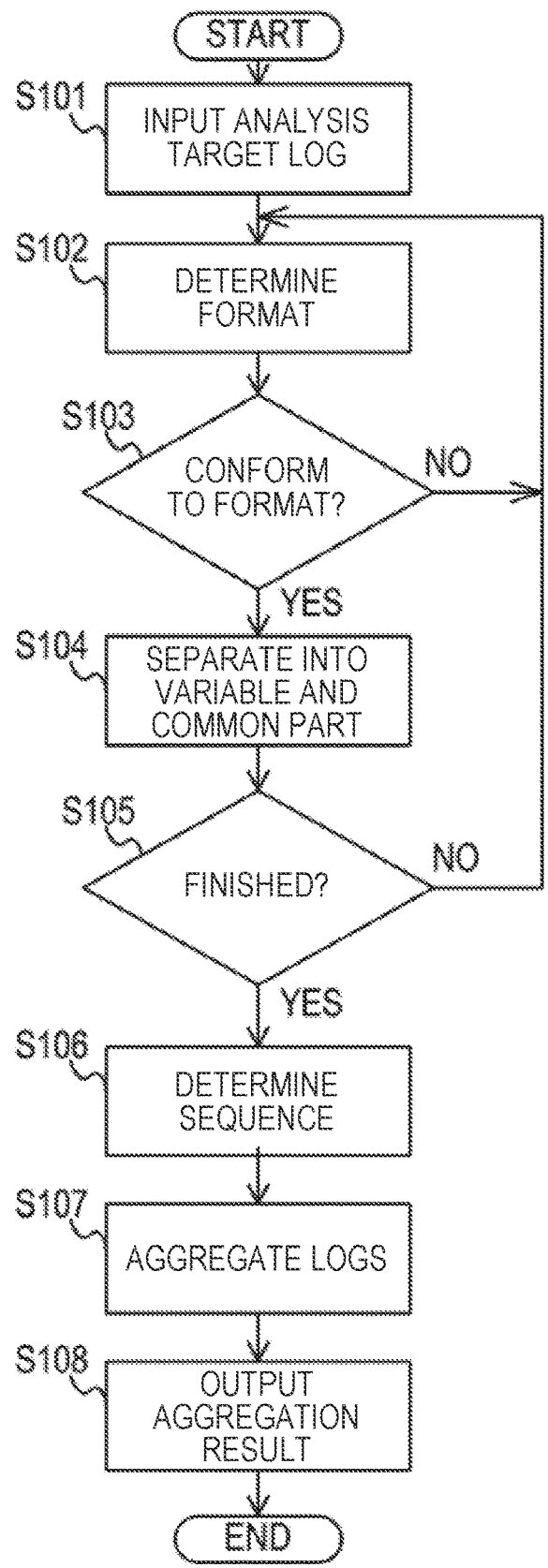
FIG. 6 is a flowchart of a log analysis method using the log analysis system according to the first example embodiment.

FIG. 6 is a diagram illustrating a flowchart of a log analysis method using the log analysis system 100 according to the present example embodiment. First, the log input unit 110 acquires and inputs the analysis target log 10 to the log analysis system 100 (step S101). The format determination unit 120 designates one log to be determined included in the analysis target log 10 input in step S101 and determines whether or not the designated log conforms to any format recorded in the format storage unit 161 (step S102).

If the log to be determined does not conform to any of the formats recorded in the format storage unit 161 in step S102 (step S103, NO), the next log in the analysis target log 10 is designated as a log to be determined, and steps S102 to S103 are repeated.

If the log to be determined conforms to any format recorded in the format storage unit 161 in step S102 (step S103, YES), the format determination unit 120 uses the format to separate the log to be determined into a variable and a common part (step S104). The format determination unit 120 records variable values in the log to be determined.

If the analysis is not finished for all the logs in the analysis target log 10 (step S105, NO), the next log in the analysis target log 10 designated as a log is to be determined, and steps S102 to S105 are repeated.

If the analysis is finished for all the logs in the analysis target log 10 (step S105, YES), it is determined which sequence recorded in the sequence storage unit 162 is matched with the logs whose formats have been determined in step S104, and logs which match the sequence are extracted (step S106). The log aggregation unit 140 then rearranges, aggregates, and outputs the logs determined to match the sequence in step S106 in accordance with the sequence (step S107).

Finally, the output unit 150 outputs the aggregation result acquired in step S106 to the display unit 20 for display to the user (step S108).

As described above, the log analysis system 100 aggregates and displays logs in accordance with the preregistered sequence. Thus, the user is able to perform log analysis with reference to logs extracted and arranged based on the correlation among the logs. Further, since logs can be aggregated from and across multiple types of log data, it is possible to reduce burden of log analysis which would otherwise be performed by reviewing multiple log data.

Second Example Embodiment

While the first example embodiment uses the identifier (format ID) of a format to define a sequence, the present example embodiment uses another information on logs to define a sequence. The device to be used and the process to be performed in the present example embodiment are the same as the first example embodiment.

FIG. 7A is a schematic diagram of first sequence information according to the present example embodiment. The sequence information illustrated in FIG. 7A includes a list of pairs of a format ID and a variable value both associated with a sequence ID that is an identifier of a sequence. For example, the character string "300 (Start)" in FIG. 7A defines that a format ID "300" and a variable value "Start" are paired.

The sequence determination unit 130 extracts, out of logs whose formats have been determined by the format determination unit 120, logs each having the format that matches a format ID of a sequence whose format has been recorded in the sequence storage unit 162 and including a variable value paired with the format ID. Such a configuration enables the determination of a sequence based on not only the identifier of a format of the log but also a variable value included in the log.

FIG. 8 is a schematic diagram illustrating an exemplary aggregation result generated by using the first sequence information illustrated in FIG. 7A. The aggregation result includes the file name of logs, the logs, a format ID of the logs, and the sequence ID determined by the log aggregation unit 140 that are associated with each other. In this aggregation result, logs having a format ID of "300" and including variable values of "Start", "Retry", or "End" are aggregated.

FIG. 7B is a schematic diagram of second sequence information according to the present example embodiment. The sequence information illustrated in FIG. 7B includes a list of variable values associated with a sequence ID that is an identifier of a sequence. Furthermore, the file name that is an identifier of log data is attached in each format ID.

The sequence determination unit 130 extracts logs which include variable values recorded in the sequence storage unit 162 out of logs whose formats have been determined by the format determination unit 120. Such a configuration enables the determination of a sequence based on a variable value included in the log.

FIG. 7C is a schematic diagram of third sequence information according to the present example embodiment. The sequence information illustrated in FIG. 7C includes a list of pairs of a format ID and a file name as an identifier of log data both associated with a sequence ID that is an identifier of a sequence. For example, the character string "039 (message.log)" in FIG. 7C defines that a format ID "039" and a file name "message.log" are paired.

The sequence determination unit 130 extracts, out of logs whose formats have been determined by the format determination unit 120, logs each having the format that matches a format ID of a sequence whose format has been recorded in the sequence storage unit 162 and included in log data having the file name paired with the format ID. Such a configuration can determine not only the identifier of the format of the log but also the identifier (file name) of the log data in which the log is included.

The sequence information of FIG. 7A to FIG. 7C may be combined, and an identifier of log data, an identifier of a format, and a variable value may be used to define the sequence. Further, another information on the log may be further combined and used to defined the sequence.

As described above, in the present example embodiment, various information on a log to be analyzed can be used to determine a sequence and aggregate the logs.

Third Example Embodiment

Figure 9:
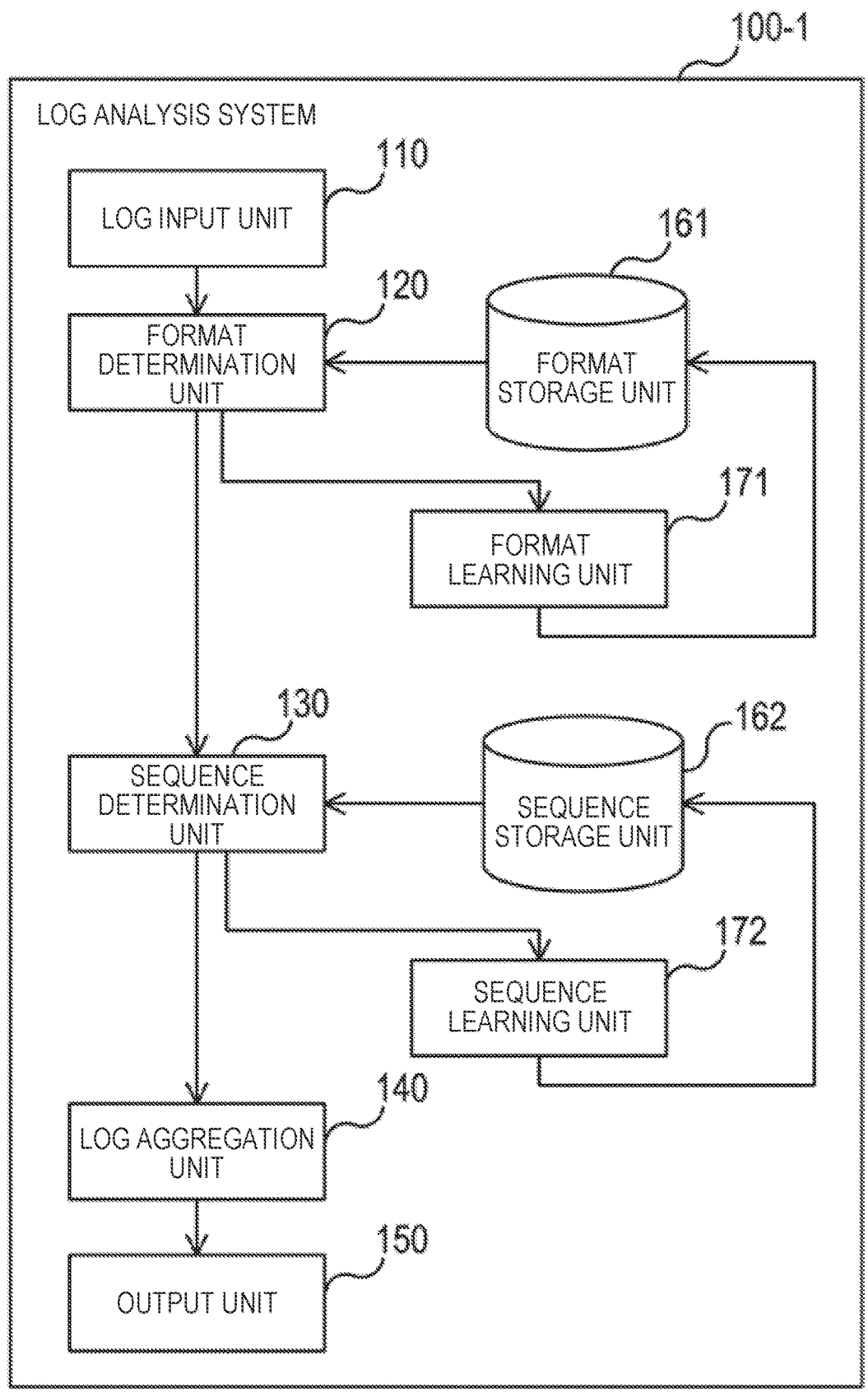
FIG. 9 is a block diagram of a log analysis system according to a third example embodiment.

FIG. 9 is a block diagram of a log analysis system 100-1 according to the present example embodiment. The log analysis system 100-1 has a format learning unit 171 and a sequence learning unit 172 in addition to the configuration of FIG. 1.

When the format determination unit 120 determines a format and when a log to be determined does not conform to any of the formats recorded in the format storage unit 161, the format leaning unit 171 creates a new format and records the new format in the format storage unit 161.

As a first method for the format learning unit 171 to learn a format, the format learning unit 171 can define a new format by accumulating a plurality of logs whose formats are unknown and statistically separating the logs into changeable variables and unchangeable common parts. As a second method for the format learning unit 171 to learn a format, the format learning unit 171 can define a new format by reading a list of known variable values, determining, as a variable, a part which is the same as or similar to the known variable value out of a log whose format is unknown, and determining other parts as a common part. A value itself may be used as a known variable value, or a pattern such as normalized expression may be used. The learning method of a format is not to limited to the above, and any learning algorithm that can define a new format for an input log may be used.

When the sequence determination unit 130 determines a sequence and when a log to be determined does not match any of the sequences recorded in the sequence storage unit 162, the sequence learning unit 172 counts the number of appearances (frequency) for each format or format combination of the log. When the calculated frequency increases to a predetermined threshold or higher for a certain format combination, the sequence learning unit 172 creates and records a new sequence in the sequence storage unit 162 based on the format combination.

The sequence learning unit 172 may define a new sequence based on user input. In this case, once the user designates, via the input device, a combination of logs for which the user intends to define a sequence, the sequence learning unit 172 creates and records a new sequence based on the format combination of the log in the sequence storage unit 162. The learning method of a sequence is not limited to the above, and any learning algorithm that can define a new sequence from an input log may be used.

As described above, the log analysis system 100-1 has learning units of a format and a sequence and therefore can generate and record a new format and a new sequence from logs having an unknown format and an unknown sequence.

Fourth Example Embodiment

Figure 10A:
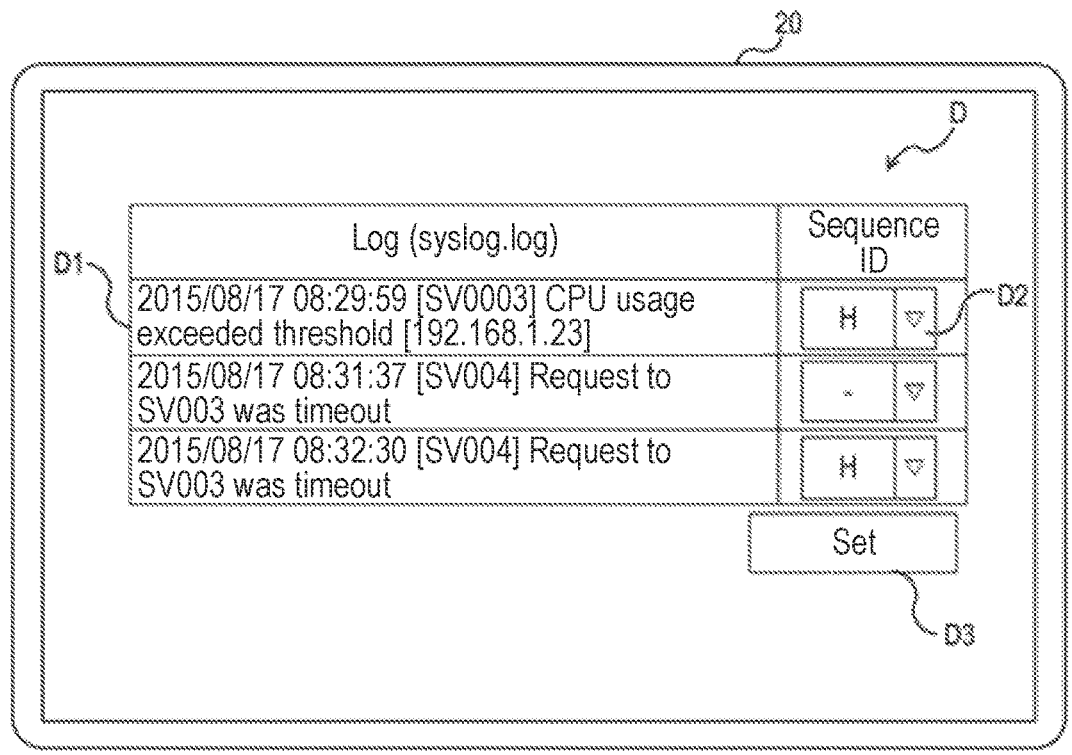
FIG. 10A is a schematic diagram of a sequence edition window according to a fourth example embodiment.
Figure 10B:
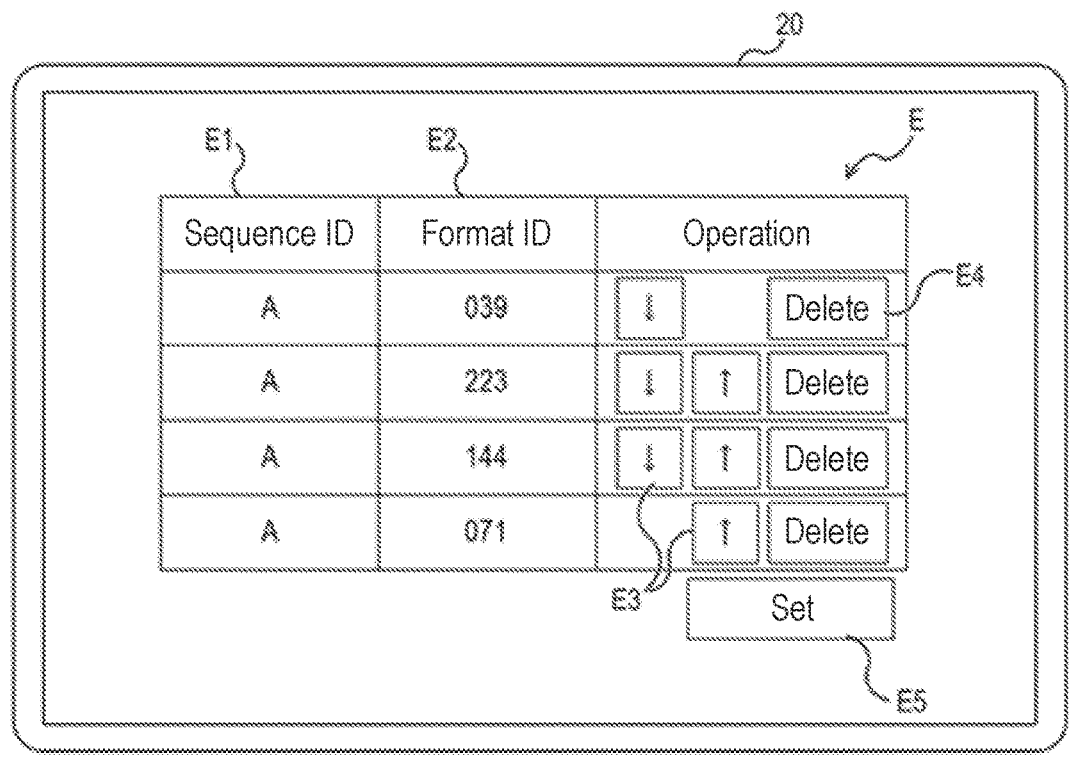
FIG. 10B is a schematic diagram of a sequence edition window according to the fourth example embodiment.

The present example embodiment provides a window used for editing sequence information. FIG. 10A and FIG. 10B are schematic diagrams illustrating an exemplary sequence information edit window using the display device 20. A window D illustrated in FIG. 10A is a window used for adding a log designated from the analysis target log 10 to a sequence. The window D includes a log D1 in the analysis target log 10, a selection box D2 used for selecting a sequence ID, and a setting button D3 used for registering the selected content.

The user uses the input device to select a sequence ID on the selection box D2 for one or more logs D1 that the user intends to add to a sequence and then press down the setting button D3. Then, in the sequence information recorded in the sequence storage unit 162, the log analysis system 100 adds a format ID corresponding to the log D1 that the user intends to add to the sequence with respect to the sequence ID selected on the selection box D2. When the sequence ID selected on the selection box D2 has not been registered to the sequence information in the sequence storage unit 162, a pair of the sequence ID selected on the selection box D2 and the format ID corresponding to the log D1 that the user intends to add to the sequence are newly recorded.

A window E illustrated in FIG. 10B is a window used for changing sequence information recorded in the sequence storage unit 162. The window E includes a sequence ID field E1 that displays sequence IDs in the sequence storage unit 162, a format ID field E2 that displays format IDs associated with the sequence ID, an order change button E3, a delete button E4, and a set button E5.

The format ID field E2 displays format IDs associated with the sequence ID from the top to the bottom in the order defined by the sequence information in the sequence storage unit 162. The order change button E3 is a button used for moving a format ID of the format ID field E2, and a format ID moves upward or downward one by one each time the order change button E3 is pressed down. Further, the delete button E4 is a button used for deleting a format ID of the format ID field E2 and, when pressed down, deletes the format ID.

The user uses the input device to perform order change of the format ID by using the order change button E3 or deletion of the format ID by using the delete button E4 and then press down the set button E5. Then, the log analysis system 100 changes the order of the format IDs as set in the window E or deletes the format ID in the sequence information recorded in the sequence storage unit 162.

The windows illustrated in FIG. 10A and FIG. 10B each are an example, and any window may be used as long as the sequence information in the sequence storage unit 162 can be edited.

Other Example Embodiments

Figure 11:
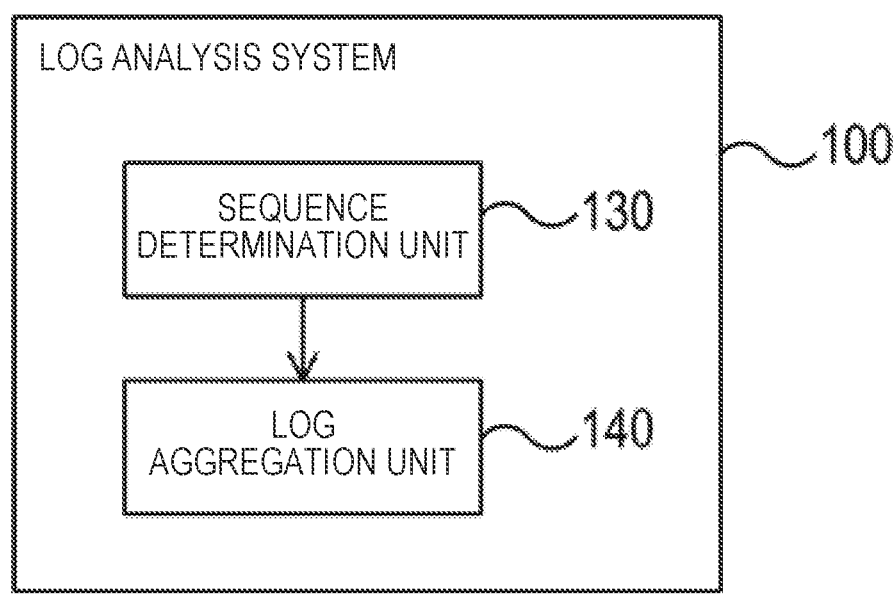
FIG. 11 is a block diagram of a log analysis system according to each example embodiment.

FIG. 11 is a general configuration diagram of the log analysis system 100 according to each of the example embodiments described above. FIG. 11 illustrates a configuration example by which the log analysis system 100 functions as a device that performs analysis of logs based on a sequence of logs. The log analysis system 100 has the sequence determination unit 130 that determines which predetermined sequence is matched with a plurality of logs of the analysis target log 10 and the log aggregation unit 140 that, based on the sequence, aggregates and outputs a plurality of logs that are determined to match a sequence by the sequence determination unit 130.

The present invention is not limited to the example embodiments described above and can be properly changed within a scope not departing from the spirit of the present invention.

Further, the scope of each of the example embodiments includes a processing method that stores, in a storage medium, a program causing the configuration of each of the example embodiments to operate so as to realize the function of each of the example embodiments described above (more specifically, a program causing a computer to perform the process illustrated in FIG. 6), reads the program stored in the storage medium as a code, and executes the program in a computer. That is, the scope of each of the example embodiments includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)
A log analysis system comprising:
a sequence determination unit that determines which predetermined sequence is matched with a plurality of logs of an analysis target log; and
a log aggregation unit that, based on the sequence, aggregates and outputs the plurality of logs determined to match the sequence by the sequence determination unit.

(Supplementary Note 2)
The log analysis system according to supplementary note 1, wherein the sequence is information that associates information on the plurality of logs with order of outputting the plurality of logs.

(Supplementary Note 3)
The log analysis system according to supplementary note 2 further comprising:
a form determination unit that determines which predetermined form is matched with the plurality of logs, wherein the information on the plurality of logs includes information indicating the form.

(Supplementary Note 4)

The log analysis system according to supplementary note 3,
wherein the form determination unit extracts a variable value from the plurality of logs based on the form, and
wherein the information on the plurality of logs includes information indicating the variable value.

(Supplementary Note 5)

The log analysis system according to any one of supplementary notes 1 to 4,
wherein the analysis target log comprises a plurality of data, and
wherein the sequence determination unit is configured to perform determination on the plurality of logs read from the plurality of data.

(Supplementary Note 6)

The log analysis system according to any one of supplementary notes 1 to 5 further comprising:
a sequence learning unit that newly generates the sequence based on the plurality of logs determined to not match the sequence.

(Supplementary Note 7)

A log analysis method comprising steps of:
determining which predetermined sequence is matched with a plurality of logs of an analysis target log; and
based on the sequence, aggregating and outputting the plurality of logs determined to match the sequence.

(Supplementary Note 8)

A log analysis program that causes a computer to perform steps of:
determining which predetermined sequence is matched with a plurality of logs of an analysis target log; and
based on the sequence, aggregating and outputting the plurality of logs determined to match the sequence.

This application is based upon and claims the benefit of priority from Japanese Patent Application No. 2015-223053, filed on Nov. 13, 2015, the disclosure of which is incorporated herein in its entirety by reference.

The invention claimed is:

1. A log analysis system comprising:
a memory configured to store instructions; and
a processor configured to execute the instructions to:
determine which predetermined sequence concerning multiple types of logs is matched with a plurality of logs of an analysis target log; and
performing an aggregating and an outputting of the plurality of logs determined to match the sequence, based on the sequence,
wherein the outputting of the plurality of logs comprises controlling a display to display a user interface comprising an aggregation result and to, when the aggregation result is selected by a user, expand the aggregation result in the user interface and display the plurality of logs,
wherein the aggregation result includes a time range and a number representing a quantity of the plurality of logs which match the sequence.

2. The log analysis system according to claim 1, wherein the sequence is information that associates information on the plurality of logs with order of outputting the plurality of logs.

3. The log analysis system according to claim 2,
wherein the processor is further configured to execute the instructions to determine which predetermined form is matched with the plurality of logs, and
wherein the information on the plurality of logs includes information indicating the form.

4. The log analysis system according to claim 3,
wherein the processor is further configured to execute the instructions to extract a variable value from the plurality of logs based on the form, and
wherein the information on the plurality of logs includes information indicating the variable value.

5. The log analysis system according to claim 1,
wherein the analysis target log comprises a plurality of data, and
wherein the processor is further configured to execute the instructions to determine the plurality of logs read from the plurality of data.

6. The log analysis system according to claim 1,
wherein the processor is further configured to execute the instructions to newly generate the sequence based on the plurality of logs determined to not match the sequence.

7. The log analysis system according to claim 1,
wherein the processor is further configured to execute the instructions to further control the user interface to receive user input directing whether to match the predetermined sequence with at least one of the plurality of logs.

8. A log analysis method comprising:
determining which predetermined sequence concerning multiple types of logs is matched with a plurality of logs of an analysis target log; and
based on the sequence, performing an aggregating and an outputting of the plurality of logs determined to match the sequence,
wherein the outputting of the plurality of logs comprises controlling a display to display a user interface comprising an aggregation result and to, when the aggregation result is selected by a user, expand the aggregation result in the user interface and display the plurality of logs,
wherein the aggregation result includes a time range and a number representing a quantity of the plurality of logs which match the sequence.

9. A non-transitory storage medium in which a log analysis program is stored, the program causing a computer to execute:
determining which predetermined sequence concerning multiple types of logs is matched with a plurality of logs of an analysis target log; and
based on the sequence, performing an aggregating and an outputting of the plurality of logs determined to match the sequence,
wherein the outputting of the plurality of logs comprises controlling a display to display a user interface comprising an aggregation result and to, when the aggregation result is selected by a user, expand the aggregation result in the user interface and display the plurality of logs,
wherein the aggregation result includes a time range and a number representing a quantity of the plurality of logs which match the sequence.

* * * * *